United States Patent [19]

Roth

[11] 4,016,382
[45] Apr. 5, 1977

[54] TRAVELLING SWITCHING BLOCK FOR METALLIC ENCAPSULATED HIGH VOLTAGE SWITCHING INSTALLATION

[75] Inventor: Adrian W. Roth, Aarau, Switzerland

[73] Assignee: Sprecher & Schuh AG, Switzerland

[22] Filed: Oct. 15, 1974

[21] Appl. No.: 515,041

[30] Foreign Application Priority Data

Oct. 5, 1973  Switzerland .................... 15517/73

[52] U.S. Cl. .......................... 200/148 R; 174/18; 174/161 R
[51] Int. Cl.² ........................................ H01H 33/54
[58] Field of Search ....... 200/148 R, 148 A, 148 D, 200/148 B; 174/161, 18

[56] References Cited
UNITED STATES PATENTS 2,427,184  9/1947  Bilodeau ........................ 174/161 R

FOREIGN PATENTS OR APPLICATIONS 1,371,871  8/1964  France ........................... 200/148 B
762,804  1/1953  Germany ....................... 174/161 R Primary Examiner—Robert S. Macon

[57] ABSTRACT

A travelling switching block for a metallic encapsulated high-voltage switching installation wherein at or in a switching block housing there are assembled together into a metallic encapsulated insulated and transportable structural unit at least one input duct or throughpassage and one output duct or throughpassage as well as power- and/or disconnector switches and possibly additional quick grounders, voltage converters, current converters and work grounders. At least each duct or throughpassage which extends upwardly in operating position is pivotable by means of an insulating medium tight pivoting mechanism into a transport position producing a smaller transverse profile.

8 Claims, 8 Drawing Figures

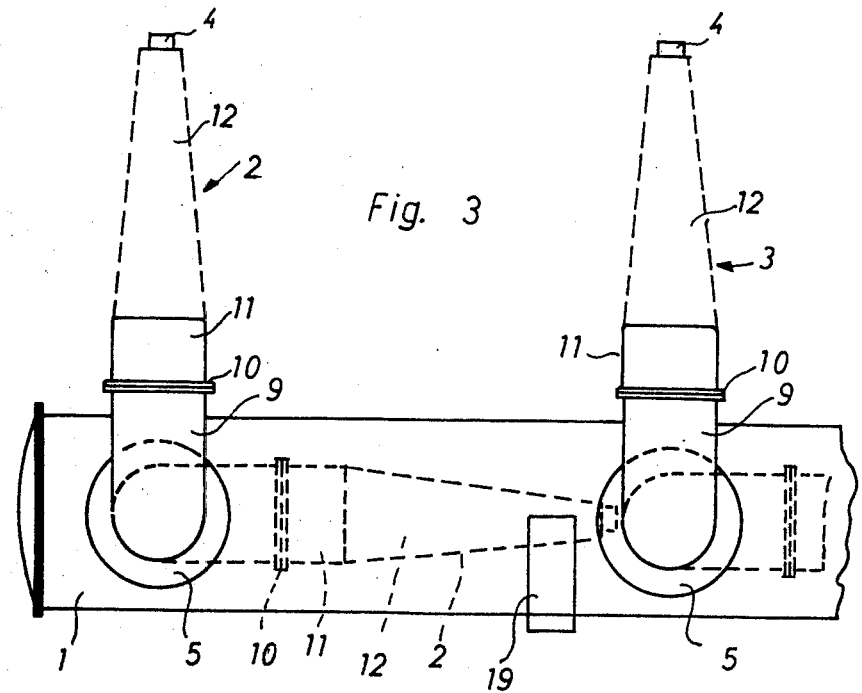
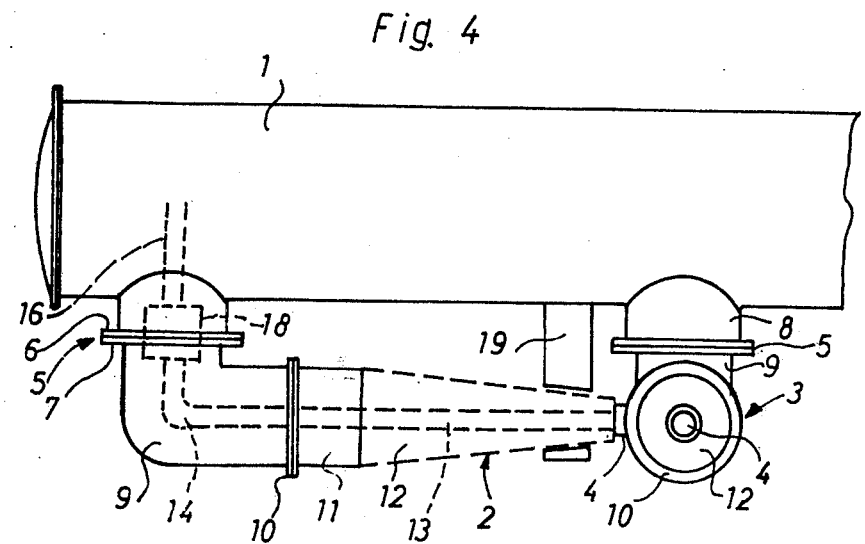

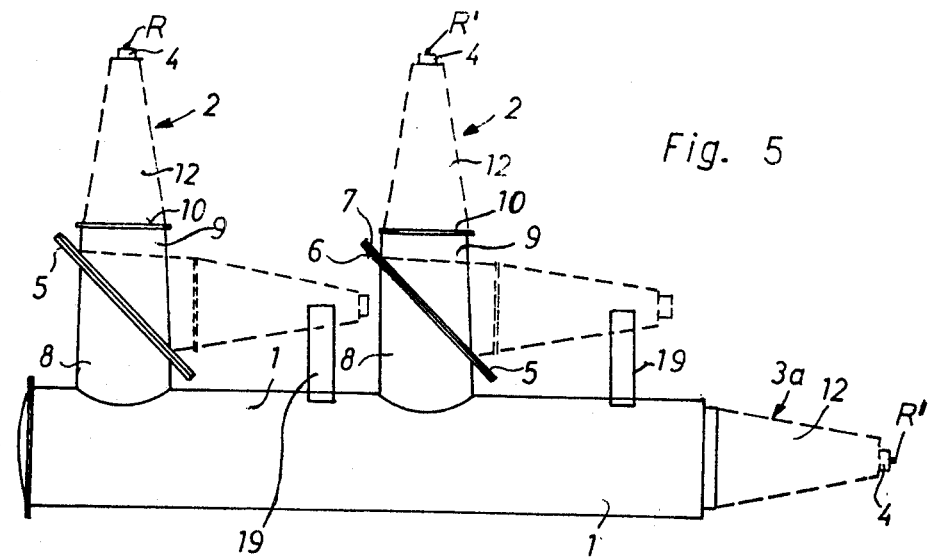
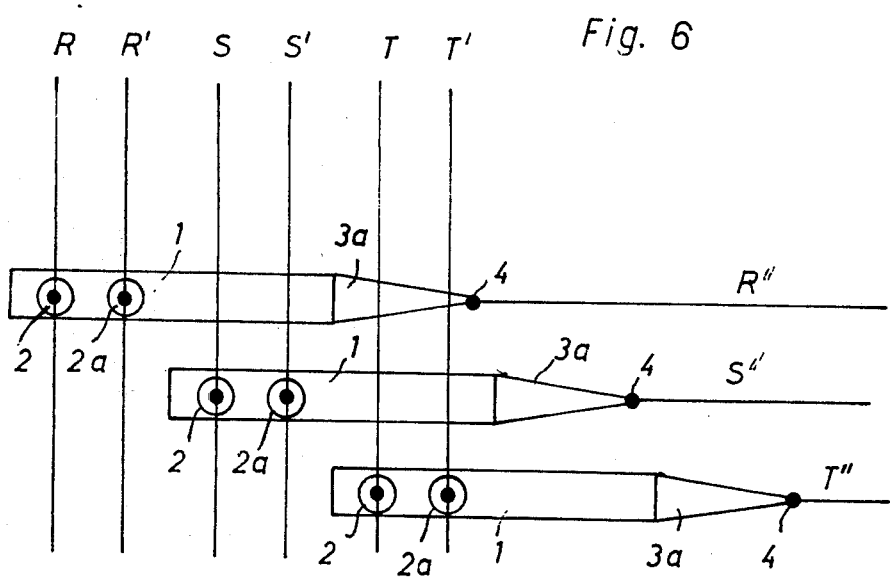

TRAVELLING SWITCHING BLOCK FOR METALLIC ENCAPSULATED HIGH VOLTAGE SWITCHING INSTALLATION

BACKGROUND OF THE INVENTION

The present invention relates to a new and improved construction of a travelling switching block for metallic encased or encapsulated high-voltage switching installations in which at or in a switching block housing there are assembled together into a metallic encapsulated insulated and transportable structural unit at least one input throughpassage or duct and an output throughpassage or duct as well as power- and/or disconnector switches and possibly additional rapid grounders, voltage converters, current converters and work grounders.

In order to shorten the mounting or assembly work during the re-erection and especially during the amplification of existing high-voltage switching installations and to considerably reduce the spatial requirements it has already been proposed to group together into a metallic encapsulated or encased gas insulated block the switching components for a switching field, in other words in essentially an input duct or throughpassage with rapid grounder, disconnector switch, voltage converter, power switch, current converter, work grounder and output throughpassage. Since the finished assembled structural unit, owing to its considerable size, generally does not correspond to the profile or shape requirements during the transport along the roadway and on rails, it is necessary to use low cars for the transport with the ducts or throughpassages of the switching block removed. The known switching blocks are thus only capable of being characterized as "transportable" and therewith the space requirements are reduced as well as possible, however the mounting time at the erection location is only relatively shortened, since there the ducts or throughpassages again have to be reassembled and the insulating condition reestablished and checked. The mounting of the ducts or throughpassages is time-consuming since particular measures must be adhered to in order that during the mounting no contaminants or dust can penetrate into the ducts or throughpassages. For the operational reliability it is known at high voltage switching installations that the cleanliness internally of the throughpassage supporting insulators is of particular significance.

SUMMARY OF THE INVENTION

It is therefore an object of the invention to provide a metallic encapsulated or encased travelling switching block with input throughpassage, rapid grounder, disconnector switch, voltage converter, power switch, current transducer, work grounder and output throughpassage but at least with the input duct or throughpassage, power- or disconnector switches and output throughpassage, which can be filled at the factory with the insulating medium and can be brought into a transportable state in which without violating the profile or shape requirements regarding standard transport means can be transported and which can be re-erected at the place of erection rapidly and without danger to internal contamination of the throughpassages from the transport condition into the operating condition, especially without having to refill the insulating medium. Now in order to implement this object and others which will become more readily apparent as the description proceeds, the invention contemplates that at least each duct or throughpassage of the switching block which extends upwardly in the operating position can be rocked by means of an insulating medium tight pivoting mechanism into a transport position providing a smaller transverse profile. In this way the travelling switching block can be completely finished mounted in the factory and filled with insulating gas. At the place of erection it is only necessary that the throughpassages are rocked out of the transport position into the operating position, whereby the throughpassages cannot become contaminated since they are not removed. The pivotable throughpassages of the block can be laterally mounted at the switching block housing or at the top at the switching block housing. In order to obtain a small as possible transverse profile the pivotable throughpassages in the transport position can be located alongside the switching block housing and supported thereat by means of a holding block. With a switching block with two pivotable throughpassages both of the throughpassages can be oppositely pivoted towards one another in their transport position and specifically into a transport position in which the axes of the throughpassages extend parallel to one another or both of the pivotal throughpassages can be similarly pivoted into their transport position wherein the axes of the throughpassages extend coaxially in the transport position.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a side view of a travelling switching block with an input- and an output throughpassage, which are both laterally mounted at the housing, and shown in the operating position;

FIG. 4 is a front view of the travelling switching block of FIG. 3 wherein the one throughpassage can be rocked into the transport position;

FIG. 5 is a side view of a travelling switching block with two vertical input throughpassages and a horizontal output throughpassage in which both of the input throughpassages are pivotable into the transport position;

FIG. 6 schematically illustrates in front view a metallic encapsulated or encased high-voltage switching installation with three travelling switching blocks according to the showing of FIG. 5;

DETAILED DESCRIPTION OF THE PREFERRED EMBODIMENTS

Figure 1:
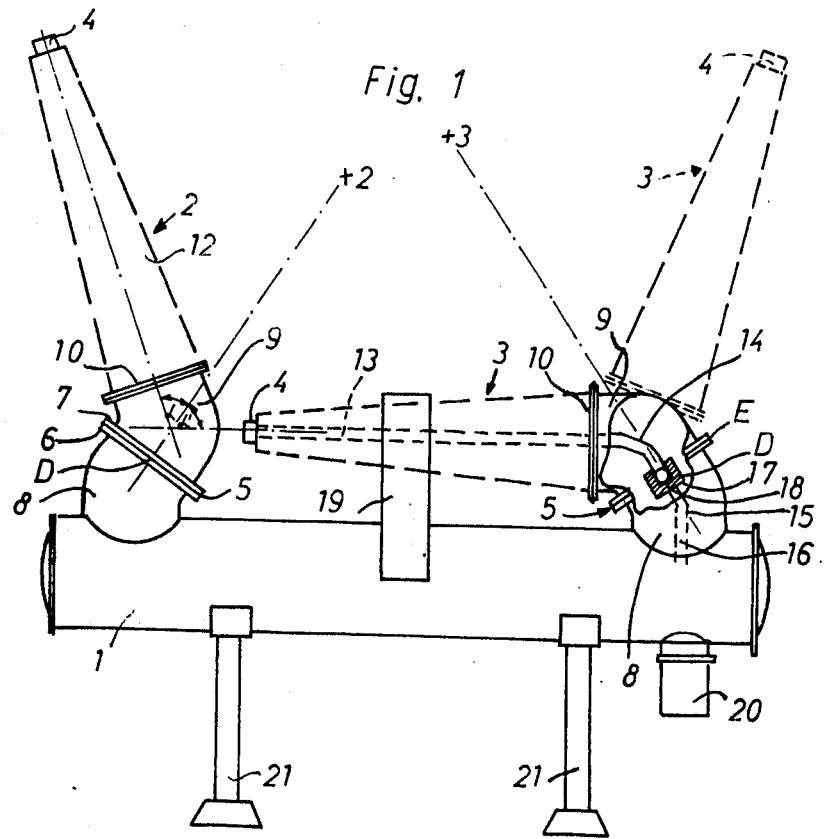
FIG. 1 is a schematic side view of a travelling switching block with an input throughpassage which extends at an inclination towards the top and a similar output throughpassage wherein the one throughpassage is upright or erected and other throughpassage is illustrated in a pivoted position.
Figure 2:
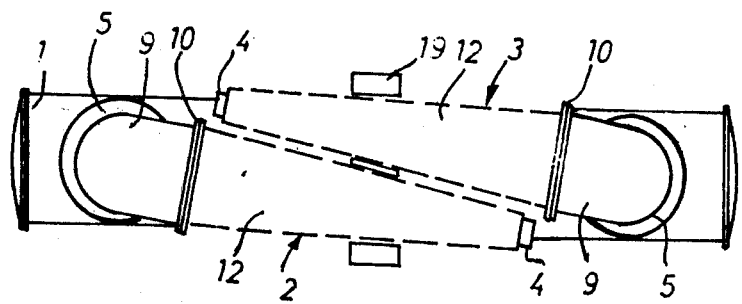
FIG. 2 illustrates the travelling switching block of FIG. 1 as viewed from the top with both throughpassages in a rocked-down or pivoted position for transport.

Describing now the drawings, with the travelling switching block illustrated in FIGS. 1 and 2 there is shown at the top at a horizontal housing 1, which has been roughly schematically shown in the drawing as a cylindrical tube or pipe, two ducts or throughpassages 2 and 3, of which one is an input throughpassage or duct and the other an output throughpassage or duct, which however are essentially of identical construction. In the operating condition both of the ducts or throughpassages 2 and 3 extend at an inclination upwardly and outwardly, so that their end closures 4 possess the necessary spacing from one another. In FIG. 1 there is shown the one duct or throughpassage 2 in the operating position and the other duct or throughpassage 3 in the transport position and for the duct or throughpassage 3 there has been illustrated by broken lines the operating position. Each throughpassage 2, 3 is mounted upon a pivotable or pivoting mechanism 5 constructed in the manner of a rotating ring disk and is pivotable about the pivot or rotating axes $x_2$ and $x_3$ which are perpendicular to the plane of the disks. The alignment of the pivot plane in space and thus the pivot axes $x_2$ and $x_3$ is determined by the directional angle of the duct or throughpassage axis during the operating position and the transport position, wherein the angle between the throughpassage axis with the duct or throughpassage located in the operating position and the rotating axis $x_2$ is equal to the angle between the rotating axis $x_2$ and the throughpassage axis with the duct or throughpassage located in the transport position. The pivot mechanism 5 essentially consists of two ring disks 6 and 7 which bear against one another, wherein the one ring disk 6 is rigidly connected via a housing branch 8 with the switching block housing 1. The other ring disk 7 carries at its topside a housing portion 9, to which there is attached a supporting insulator 12 of the ducts or throughpassages 2, 3 possibly through the agency of a further housing portion (not shown) by means of a flange connection 10. As clearly to be seen by the showing in FIG. 1 with the duct or throughpassage 3 rocked into the transport position, the housing branch 8 possessing the curved shape in this position together with the likewise curved-shaped housing portion 9 forms an arc. The intermediate conductor 13 which is coaxial with the supporting insulator 12 is secured to the end closure 4 and held by the flange connection 10 in the usual manner by an insulating disk (not shown) and centered. From that location, the intermediate conductor 13 leads to an arcuate element 14 up to the center point of the pivot plane E defined by the ring disks 6 and 7 and its end carries a ball 17 which is concentric with the pivot plane center point, which together with a socket 18 forms a couple contact of known construction. From the socket 18 there leads away a flexed conductor piece 15 which merges into linear conductor piece 16. The linear conductor piece 16 is connected in conventional manner with an intermediate conductor piece of the switching block housing 1 or can be connected by means of a disconnector. The housing branch 8 is secured at the switching block housing 1 preferably by means of a conventional flange connection, which has not been particularly shown in the drawing to preserve clarity in illustration, and in the flange connection there is advantageously provided a further insulating disk, so that the housing branches or arcs 8, 9 are partitioned.

A further support for the conductor components 14, 15 and the coupling contacts 17, 18 which interconnect the same is generally not necessary, since upon pivoting, the ball 17 is only rotated about the rotational axis $x_3$ and $x_2$ respectively. The pivot mechanism 5 with both of the ring disks 6, 7 is pressure gas tight. The seal is also ensured during the pivot operation such that only inconsequential traces of the insulating medium escape and owing to the internal excess pressure no foreign media can enter. An exemplary embodiment for such pressure gas tight pivot mechanism will be described in detail hereinafter in conjunction with FIGS. 7 and 8. The ducts or throughpassages 2 and 3 are in this case pivotable through almost 180°, preferably in opposite directions, i.e. for instance duct or throughpassage 2 forwardly and duct or throughpassage 3 rearwardly. For transport, it is thus necessary in FIG. 1 that the throughpassage or duct 2 be rocked to the transport position. FIG. 2 illustrates in front view the switching block with ducts or throughpassages 2, 3 rocked into the transport position. The ducts or throughpassages are both inwardly rocked or pivoted and their central axes are aligned parallel to one another and at an inclination with respect to the vertical central plane of the switching block housing 1. In order that the throughpassages 2, 3 can be fixed during transport there is provided a holding block or holding block means 19 at the switching block housing 1, at which engage the ducts or throughpassages 2, 3. The travelling switching block furthermore contains at least a power- or disconnector switch 20 and possibly also rapid grounders, voltage converters, current converters and work grounders, as such is known and therefore need not here be further explained. The switching block housing 1 is carried by the carrier or support studs 21.

The travelling switching block can be completely mounted at the factory and for instance filled with pressurized insulating gas ($SF_6$). For transport, the ducts or throughpassages 2, 3 are placed against the housing 1 (FIG. 2) so that there results a relatively small transverse profile, which hardly is not capable of fulfilling any profile or shape regulations. At the place of erection it is only then necessary to erect the ducts or throughpassages, and specifically simply by rocking in the pivot mechanisms, which are subsequently locked or arrested. The previously described travelling switching block has a transverse profile width which essentially corresponds to the largest diameter of the switching block housing 1.

In FIGS. 3 and 4 there is again illustrated a further exemplary variant, the transverse profile of which possesses a larger width, which however, has additional advantages. The travelling switching block shown in FIG. 3 in side view and in FIG. 4 in front view is equipped with two vertical ducts or throughpassages 2, 3, which in this case however are laterally mounted at the housing 1. The switching block housing 1 possesses for each duct or throughpassage 2, 3 a laterally protruding branch 8 at which there is secured a ring disk 6 of the pivot mechanism 5. The pivot plane which is determined by the ring disk 6 is parallel to the vertical central plane of the switching block housing 1. The other ring disk 7 of the pivot mechanism 5 carries a housing portion 9 in the form of a 90° bend or arc. At the other end of the arc-shaped housing portion 9 there is secured, by means of a flange connection 10, a further housing portion 11 and the supporting insulator 12 of the duct or throughpassages 2, 3. The central or intermediate conductor 13 of the ducts or throughpassages 2, 3 is again secured to the end closure 4 and is held in an insulating disk in the flange connection 10. In the housing portion 9 there is located the curved conductor piece 14 of the intermediate conductor, which this time is flexed through 90° and carries at the end a ball of the ball contact. From the socket 18 of the coupling contact there extends a straight conductor piece 16 to a central or intermediate conductor element of the switching block housing 1. With this embodiment there is the possibility of rocking the ducts or throughpassages 2, 3 into random position. In the operating position, the ducts or throughpassages 2, 3, as illustrated in FIG. 3, can be erected vertically or, as in FIG. 1, at an inclination upwardly. For transport, the ducts or throughpassages 2, 3 can be horizontally placed, and specifically both in one direction extending towards the front, as in FIG. 3, or they can be rocked towards one another, in other words, both inwardly, so that the switching block viewed in the transport position from the side would look like the front view depicted in FIG. 2. This advantage of the random adjustability of the ducts or throughpassages 2, 3 is however attained at the expense of a larger transverse profile width, which is approximately larger than the maximum diameter of the switching block housing 1 plus the maximum diameter of the throughpassage.

As a further exemplary embodiment there is shown in FIG. 5 in schematic side view a travelling switching block with two input ducts or throughpassages 2 and 2a and an output duct or throughpassage 3a. The vertical input ducts or throughpassages 2, 2a are arranged at the top at the switching block housing 1 and the housing branch 8, the housing component 9 as well as the pivot mechanisms located therebetween can constructed such as has been described in conjunction with FIG. 1. With this switching block, the input ducts or throughpassages 2, 2a however can be rocked through 180° so as to extend towards the front and accordingly the pivot planes of the pivot mechanisms 5 are parallel to one another. In the transport position the input ducts or throughpassages 2, 2a are again supported by the holding blocks 19 arranged at the block housing 1. Forwardly at the end surface of the switching block housing 1 there is secured coaxially therewith the output throughpassage 3a. The output throughpassage 3a is not pivotable. The input end closures 4 in operating position are located in a higher plane than the output end closure. A switching installation composed of such travelling switching blocks has been shown in front view in FIG. 6. The switching blocks are identical. Each switching block is connected at its input side with its end closures 4 at a two-phase conductor R, R'' and S, S'' and T, T'' respectively, and from its end closure 4 the output throughpassage 3a there leads away the corresponding output conductors R'' and S'' and T'' respectively. The switching blocks are arranged parallel to one another and mutually offset in their lengthwise direction, so that the input conductor as well as the output conductor extend perpendicular to one another and always parallel to one another.

Figure 7:
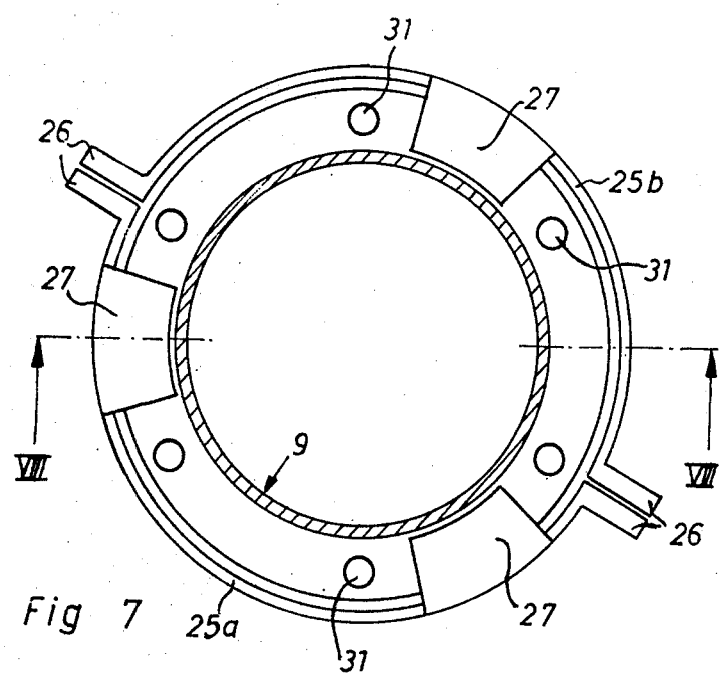
FIG. 7 is a pivotable mechanism for the throughpassages in front view.
Figure 8:
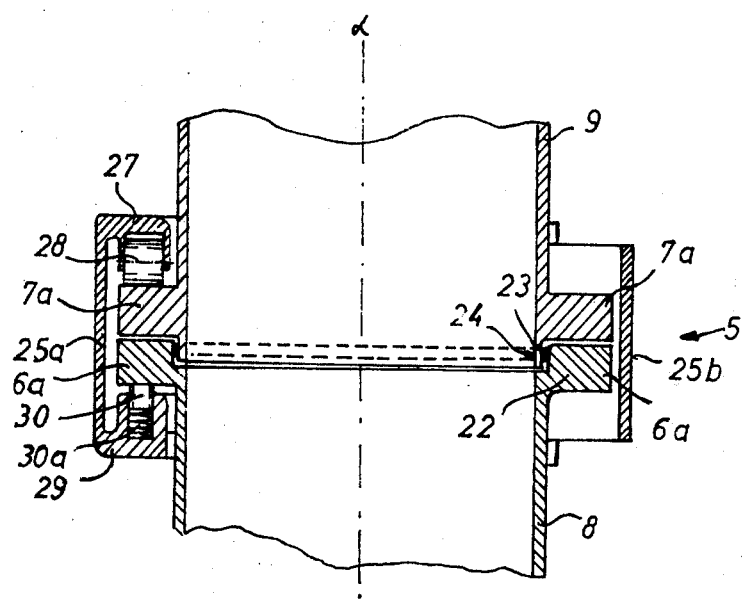
FIG. 8 is a cross-sectional view through the pivotable mechanism taken along the line VIII— VIII of FIG. 7.

A particularly simple pressure gas tight pivotal mechanism has been shown in front view in FIG. 7 and in FIG. 8 in sectional view along the line VIII — VIII of FIG. 7. The rotating ring disks 6,7 of the pivot mechanism are flanges of the housing portions 8, 9. The flange 6a of the housing branch 8 possesses at the inner side a continuous ring-shaped shoulder 22 and the flange 7a of the housing portion 9 a projection 23 which fits therewith. Between the shoulder 22 and the projection 23 there is inserted a sealing ring 24. The housing portion 9 can be rotated about the central axis $x$ such that the flange 7a slides upon the flange 6a. In order to ensure easy sliding there can be provided, between the flanges, a sliding- and sealing mass. The flanges 6a, 7a possess bores 31 which are distributed over the entire periphery such that the bores 31 of the flange 7a both in the operating position as well as in the transport position align with the bores of the flange 6a and both of the housing portions 8 and 9 in each of these positions can be threaded together at the flanges. A two-part ring 25a, 25b is placed about the flanges 6a, 7a and carries at the joint locations for threading together eye projections 26. At a number of locations, for instance three, which are at the same spacing from one another there are provided on the ring 25a, 25b at the upper and lower side a respective oppositely situated jaw 27, 29, which engage, in a clamp-like manner, the flanges 6a, 7a and hold them pressed together. In order to ensure easy rotation of the housing portion 9, the clamp jaw 27 which acts upon the flange 7a of the housing portion 9 carries at the underside a radially aligned roller 28 and the clamp jaw 29 which is situated opposite thereto carries a spring bolt or spring-loaded bolt 30, 30a, so that the flanges 6a, 7a also can be positively held together when the thread connection is released. Instead of the individual clamp jaws 27, 29 the ring 25a, 25b can also possess a substantially U-shaped profile, wherein at the end sides at the region of the bores 31 there are provided recesses. Such or similar constructed pivot mechanisms have the advantage that they can be used solely for the transport of the travelling switching block, and after the erection of the ducts or throughpassages in the operating position and the threading of the flanges 6a, 7a, they can be detached. The indicated constructions represent only exemplary embodiments. It is possible to also use pivot mechanisms of different construction, provided that they allow for easy pivoting of the throughpassages and also are pressure tight during the pivot operation.

It is apparent that the momentary nature of the projection of the throughpassages, for instance whether at the top at the switching block housing or laterally, as well as the position of the pivot mechanism between the housing branch 8 and the pivotable housing portion 9 is determined itself by the dimensions of the switching block, especially by the length of the throughpassages and their mutual spacing as well as by the space which is available in each instance at the place of erection. On the basis of the previously described embodiments, it is possible without difficulty to find in each instance the optimum construction.

While there is shown and described present preferred embodiments of the invention, it is to be distinctly understood that the invention is not limited thereto, but may be otherwise variously embodied and practiced within the scope of the following claims.

Accordingly, what is claimed is:

1. A travelling switching block for metallic encapsulated high-voltage switching installations wherein to a switching block housing there are joined together into a metal encapsulated insulated and transportable structural unit at least one input duct and one output duct, the switching block being filled with insulating medium, the improvement comprising pivot means connecting each duct to the housing, each said duct extending upwardly in an operating position from the block housing and being movable by said pivot means into a transport position providing a small transverse profile, said pivot means including sealing means for sealing the respective duct against loss of insulating medium, each duct being supported by said pivot means such that in the transport position the duct is located at the lengthwise side of the switching block housing in the transport position, said pivot means further including a rotatable ring disk, and a stationary ring disk secured to the block housing and supporting the rotatable ring disk, said rotatable ring disk including a housing portion to which said duct is secured, each duct including an inner conductor, said switching block housing also including an inner conductor, and a coupling contact arranged in a pivot plane of said pivot means connecting the inner conductor of the duct with the inner conductor of the switching block housing.

2. The travelling switching block as defined in claim 1, wherein two pivotable ducts are provided, wherein both pivotable ducts are rocked in the transport position opposite one another and in the transport position the axes of the ducts are located essentially parallel to one another.

3. The travelling switching block as defined in claim 1, wherein two pivotable ducts are provided, wherein both of the pivotable ducts are pivotable in the same direction towards one another in the transport position and in the transport position the axes of the ducts extend essentially coaxially with respect to one another.

4. The travelling switching block as defined in claim 1 wherein said coupling contact consists of a ball at one conductor portion and a ball socket secured to another conductor portion, the ball having a center point located at the point of rotation of said pivot means.

5. The travelling switching block as defined in claim 4, wherein each pivotable duct of the block is laterally mounted on the switching block housing, a housing projection which laterally protrudes from the switching block, said stationary ring disk being secured to said housing projection, the pivot plane of said pivot means being vertical, said housing portion carried by the movable ring disk or the pivot means being constituted as a 90° bend member.

6. The travelling switching block as defined in claim 4, wherein each pivotable duct of the block is mounted at the top at the switching block housing, a housing projection arranged at the top at the switching block housing, said stationary ring disk being secured to said housing projection in such a way that the rotational axes which are perpendicular to the pivot plane are bisected by the angle between the duct axis in the operating position and the duct axis in the transport position.

7. The travelling switching block as defined in claim 6, wherein the coupling contact is coaxially arranged with the rotational axis and the conductor elements carrying the coupling contact transform an arcuate-shape into a straight intermediate conductor of the duct and into a linear conductor piece which connects the coupling contact with the inner conductor of the switching block housing, wherein the housing projection and the housing portion secured to the rotatable ring disk of the pivot means are curved in arc-shaped manner.

8. The travelling switching block as defined in claim 1, wherein the ring disks of the pivot means comprise threadable flanges which are released during pivoting of the duct and means for holding the flanges together during pivoting including a two-part ring with clamping means.

* * * * *

UNITED STATES PATENT AND TRADEMARK OFFICE
CERTIFICATE OF CORRECTION

PATENT NO. : 4,016,382
DATED : April 5, 1977

INVENTOR(S) : Adrian W. Roth

It is certified that error appears in the above-identified patent and that said Letters Patent are hereby corrected as shown below:

Cover page,
Line 9, change "October 5, 1973" to --November 5, 1973--

Signed and Sealed this sixteenth Day of August 1977

[SEAL]

Attest:

RUTH C. MASON
Attesting Officer

C. MARSHALL DANN
Commissioner of Patents and Trademarks